United States Patent Office 3,003,001
Patented Oct. 3, 1961

3,003,001
PROCESS FOR THE PRODUCTION OF 1-VINYL-6-ALKOXY-3,4-DIHYDRONAPHTHALENE
Richard Wightman Kierstead, Montclair, Walter Kimel, Highland Park, and William Edwin Scott, North Caldwell, N.J., assignors to Hoffmann-La Roche Inc., Nutley, N.J., a corporation of New Jersey
No Drawing. Filed Dec. 2, 1958, Ser. No. 777,563
4 Claims. (Cl. 260—612)

This invention relates to a novel method for the production of 1-vinyl-6-alkoxy-3,4-dihydronaphthalene. Previous methods for the preparation of 1-vinyl-6-alkoxy-3,4-dihydronaphthalene have involved multi-stage operations including difficult process steps. The process of this invention is a simplified procedure wherein 6-alkoxy-1-tetralone is converted simply and directly to the desired 1-vinyl-6-alkoxy-3,4-dihydronaphthalene with high yields.

The process of this invention comprises treating 6-alkoxy-1-tetralone with a vinyl magnesium halide and heating the condensation product. For best results the heating is effected in the presence of a basic aromatic amine stabilizing agent and iodine.

In the comments above and in further references in this specification, the term "alkoxy" refers in particular to lower alkoxy groups such as methoxy, ethoxy, propoxy, isopropoxy, butoxy, etc. In the case of vinyl magnesium halide, any of the halides may be used, but the bromide and chloride are preferred.

The reaction of the 6-alkoxy-1-tetralone with the vinyl magnesium halide may be effected at a temperature range from room temperature to about 50° C., e.g., from about 15° to about 50° C. The reactants may be used in a proportion of about 1:1. In order, however, to obtain practical yields of 1-vinyl-6-alkoxy-3,4-dihydronaphthalene, the reaction of the tetralone and vinyl magnesium halide should be carried out within the preferred range of 40° to 50° C. and at least about two molecular proportions of the vinyl magnesium halide for each molecular proportion of 6-alkoxy-1-tetralone should be used. Up to about 15 hours should be allowed for the reaction to take place before commencing the following step.

The product of the condensation is dissolved in a solvent, e.g., an inert aromatic solvent, preferably a hydrocarbon solvent such as benzene, toluene and the like, and heated to reflux. During this heating period, a basic aromatic amine stabilizing agent, for example, quinoline, phenyl-$\beta$-naphthylamine, p-phenylene-diamine, o-phenylenediamine, diphenylamine, and the like, is preferably present in an amount within the range of about 0.5 to about 10% of condensation product (v./w.). It is also preferred to have iodine present. The presence of these two agents is particularly effective in providing a practical scale process, especially from the point of view of yield. When iodine is used, care should be taken that the amount is within the range of about 0.02% to about 1.0% based on the weight of condensation product subjected to the heat treatment. Heating should be continued until no water is removed.

The compounds are useful in the synthesis of steroids.

The following examples are illustrative of the invention. All temperatures are expressed in degrees centigrade.

*Example 1*

To a solution of vinyl magnesium bromide (prepared according to conventional procedure from 26.3 grams of vinyl bromide and 5.65 grams of magnesium) in 80 ml. of tetrahydrofuran was added a solution of 6-ethoxy-1-tetralone (31.1 grams) in 60 ml. of tetrahydrofuran over a period of about 30 minutes. The exothermic reaction was not cooled during this addition. The resulting solution was heated under reflux for one hour and was then stirred overnight at room temperature. The reaction mixture was poured into 40 ml. of saturated ammonium chloride solution containing 50 grams of crushed ice. The phases were separated and the aqueous phase was extracted twice with ether. The organic layers were washed with 5% sodium bicarbonate and salt solution, then dried over anhydrous sodium sulfate. Removal of the solvent left an oil, which on distillation yielded the product, 1-vinyl-6-ethoxy-3,4-dihydronaphthalene, B.P. 117–129°/0.04 mm.

*Example 2*

To a solution of vinyl magnesium bromide (prepared from 15 grams of vinyl bromide and 3.02 grams of magnesium) in 60 ml. of tetrahydrofuran was added a solution of 6-methoxy-1-tetralone (20 grams) in 65 ml. of tetrahydrofuran over a period of 20 minutes. The exothermic reaction was maintained at about 40° by intermittent cooling during the addition. When the addition was completed, the solution was stirred for three hours at 40° and then stirred overnight at room temperature. The reaction mixture was then poured into 40 ml. of saturated ammonium chloride solution containing 50 grams of crushed ice. The resulting mixture was extracted three times with ether. The ether solutions were washed once with 5% sodium bicarbonate solution, once with salt solution and were then dried over anhydrous sodium sulfate. The solvent was removed leaving an amber oil as residue.

The amber oil (9.76 grams) was dissolved in 40 ml. of benzene to which were added several crystals of iodine and 0.1 ml. of quinoline. The solution was heated under reflux for 35 minutes. The benzene solution was then rapidly cooled and washed twice with sodium thiosulfate solution and dried with anhydrous sodium sulfate. The solvent was distilled off leaving the product, 1-vinyl-6-methoxy-3,4-dihydronaphthalene, as the residue.

*Example 3*

To a solution of vinyl magnesium chloride (prepared from 900 grams of vinyl chloride and 300 grams of magnesium) in 3610 ml. of tetrahydrofuran was added, dropwise, a solution of 6-methoxy-1-tetralone (1000 grams) in tetrahydrofuran (3250 ml.). The reaction temperature was maintained at 40 to 45° during the addition (about 3 to 4 hours) by external cooling. The mixture was then stirred overnight at room temperature. Finally the mixture was cooled to 10° and poured slowly onto a mixture of 5 liters of saturated aqueous ammonium chloride and 5 kg. of crushed ice so that the temperature did not exceed 20°. The aqueous layer was separated and extracted twice with ether. The ether extracts were combined with the original organic layer and washed twice with saturated sodium bicarbonate solution and then with salt solution until neutral. The product was dried with calcium sulfate and concentrated in vacuo leaving a residual amber oil.

The amber oil was dissolved in 5 liters of benzene to which were added 5 ml. of quinoline and 0.57 gram of iodine. The solution was heated under reflux for three hours. The solution was cooled, washed with 5% sodium thiosulfate solution and then washed with salt solution until neutral. It was dried with calcium sulfate and concentrated in vacuo, leaving a residual dark oil. The product, 1-vinyl-6-methoxy-3,4-dihydronaphthalene, was distilled in vacuo, B.P. 98–100°/0.1 mm.

We claim:

1. A process which comprises condensing 6-lower alkoxy-1-tetralone with vinyl magnesium halide at a temperature from about 15° to about 50° C. and heating the condensation product at a temperature up to about reflux temperature in an inert aromatic solvent to produce 1-vinyl-6-lower alkoxy-3,4-dihydronaphthalene.

2. A process which comprises condensing 6-lower alkoxy-1-tetralone with vinyl magnesium halide at a temperature from about 15° to about 50° C. and heating the condensation product at a temperature up to about reflux temperature in an inert aromatic solvent in the presence of basic aromatic amine stabilizing agent and about 0.02% to about 1.0% of iodine to produce 1-vinyl-6-lower alkoxy-3,4-dihydronaphthalene.

3. A process which comprises condensing 6-lower alkoxy-1-tetralone with vinyl magnesium halide at a temperature from about 15° to about 50° C. and heating the condensation product at a temperature up to about reflux temperature in an inert aromatic solvent in the presence of quinoline and about 0.02% to about 1.0% of iodine to produce 1-vinyl-6-lower alkoxy-3,4-dihydronaphthalene.

4. A process which comprises condensing 6-methoxy-1-tetralone with at least about two molecular proportions of vinyl magnesium chloride at a temperature from about 15° to about 50° C. and heating the condensation product in the presence of about 0.5% to about 10% of quinoline and about 0.02% to about 1.0% of iodine to produce 1-vinyl-6-methoxy-3,4-dihydronaphthalene.

References Cited in the file of this patent

Kharasch et al.: Grignard Reaction of Nonmetallic Substances (1954), pp. 36–37.

Normant: Compt. Rend., vol. 240 (1955), pp. 631–633.

Royals: Advanced Organic Chemistry (1956), pp. 232–233.